United States Patent
Guo

(10) Patent No.: US 11,096,299 B2
(45) Date of Patent: Aug. 17, 2021

(54) ELECTRONIC DEVICE

(71) Applicants: Inventec (Pudong) Technology Corporation, Shanghai (CN); INVENTEC CORPORATION, Taipei (TW)

(72) Inventor: Chang-Sing Guo, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 131 days.

(21) Appl. No.: 16/561,042

(22) Filed: Sep. 5, 2019

(65) Prior Publication Data
US 2021/0068288 A1 Mar. 4, 2021

(30) Foreign Application Priority Data

Aug. 26, 2019 (CN) .......................... 201910787697.4

(51) Int. Cl.
| | |
|---|---|
| *H05K 7/12* | (2006.01) |
| *H05K 9/00* | (2006.01) |
| *H05K 5/02* | (2006.01) |
| *G06K 9/00* | (2006.01) |

(52) U.S. Cl.
CPC .............. *H05K 7/12* (2013.01); *H05K 5/0221* (2013.01); *H05K 9/0067* (2013.01); *G06K 9/00885* (2013.01)

(58) Field of Classification Search
CPC ...... H05K 7/12; H05K 9/0067; H05K 5/0221; G06K 9/00885
See application file for complete search history.

(56) References Cited

U.S. PATENT DOCUMENTS

| | | | |
|---|---|---|---|
| 9,135,495 B1* | 9/2015 | Pope | G06K 9/0002 |
| 9,697,409 B2* | 7/2017 | Myers | G06K 9/0002 |
| 9,779,278 B2* | 10/2017 | Nilsson | G06K 9/3216 |
| 10,078,778 B2 | 9/2018 | Adalsteinsson et al. | |
| 10,706,252 B2* | 7/2020 | Miller | G06K 9/0002 |
| 2008/0049980 A1* | 2/2008 | Castaneda | G06K 9/00013 382/115 |
| 2008/0238878 A1* | 10/2008 | Wang | G06F 3/03547 345/173 |

(Continued)

FOREIGN PATENT DOCUMENTS

| | | |
|---|---|---|
| TW | M491216 U | 12/2014 |
| TW | I635410 B | 9/2018 |

*Primary Examiner* — Hung S. Bui
*Assistant Examiner* — Sagar Shrestha
(74) *Attorney, Agent, or Firm* — CKC & Partners Co., LLC

(57) ABSTRACT

An electronic device includes a chassis, a back plate, a bracket, and a biological characteristic recognition module. The back plate is fixed to a chassis and has a first through hole. The bracket is fixed to a side of the back plate away from the chassis. The bracket has an accommodating slot recessed away from the chassis. The biological characteristic recognition module is located in the first through hole. The biological characteristic recognition module is abutted between the bracket and the chassis. The biological characteristic recognition module has at least one electronic component. The electronic component is accommodated in the accommodating slot.

6 Claims, 4 Drawing Sheets

(56) References Cited

U.S. PATENT DOCUMENTS

| | | | |
|---|---|---|---|
| 2010/0008545 A1* | 1/2010 | Ueki | G06K 9/00885 382/115 |
| 2010/0321159 A1* | 12/2010 | Stewart | G07C 9/257 340/5.83 |
| 2015/0071509 A1* | 3/2015 | Myers | G06K 9/0002 382/124 |
| 2015/0245514 A1* | 8/2015 | Choung | H05K 5/0247 361/749 |
| 2016/0004899 A1* | 1/2016 | Pi | G06K 9/0002 345/173 |
| 2017/0213068 A1* | 7/2017 | Chang | H04M 1/23 |
| 2018/0034948 A1* | 2/2018 | Yu | G06F 1/1637 |
| 2018/0053035 A1* | 2/2018 | Wu | G06F 1/1684 |
| 2018/0365472 A1* | 12/2018 | Cai | G06K 9/209 |
| 2019/0037060 A1* | 1/2019 | Yu | G06F 1/1684 |
| 2019/0057242 A1* | 2/2019 | Guo | G06K 9/62 |
| 2019/0163953 A1* | 5/2019 | Jin | G06K 9/00046 |
| 2019/0208043 A1* | 7/2019 | Cha | H04M 1/02 |
| 2020/0026901 A1* | 1/2020 | Chen | G06K 9/00046 |
| 2020/0293737 A1* | 9/2020 | Kim | G06F 3/016 |
| 2020/0302142 A1* | 9/2020 | Liu | G06F 21/32 |
| 2020/0356749 A1* | 11/2020 | Ye | G06K 9/0004 |
| 2020/0380240 A1* | 12/2020 | Liu | G06K 9/00013 |
| 2020/0410192 A1* | 12/2020 | Kim | G06F 3/0412 |
| 2021/0036069 A1* | 2/2021 | Ha | G06K 9/0002 |

\* cited by examiner

ELECTRONIC DEVICE

CROSS-REFERENCE TO RELATED APPLICATION

This application claims priority to China Application Serial Number 201910787697.4, filed Aug. 26, 2019, which is herein incorporated by reference in its entirety.

BACKGROUND

Field of Invention

The present invention relates to an electronic device. More particularly, the present invention relates to the electronic device including a biological characteristic recognition module.

Description of Related Art

With the advent of the technological age, a large amount of electronic devices are used in the daily life, and the electronic devices provide many conveniences in life. Among them, the electronic device equipped with a biological characteristic recognition module gradually becomes a trend since it can effectively prevent data stored in the electronic device from being stolen.

Generally, the biological characteristic recognition module is fixed to a chassis of the electronic device by a bracket. As the electronic device becomes thinner and lighter, the size of the biological characteristic recognition module is also reduced. Electronic components and circuits of the biological characteristic recognition module are integrated into a central area of the biological characteristic recognition module also. However, the current bracket is full-face pressed and the pressed face of the bracket is abutted to the biological characteristic recognition module. If the said bracket is used to fix the biological characteristic recognition module, the electronic components located in the central area of the biological characteristic recognition module will be damaged by the bracket.

Accordingly, how to provide an electronic device to solve the aforementioned problems becomes an important issue to be solved by those in the industry.

SUMMARY

The invention provides an electronic device capable of effectively preventing damage of electronic components on a biological characteristic recognition module.

According to an embodiment of the disclosure, the electronic device includes a chassis, a back plate, a bracket, and a biological characteristic recognition module. The back plate is fixed to a chassis and has a first through hole. The bracket is fixed to a side of the back plate away from the chassis. The bracket has an accommodating slot recessed away from the chassis. The biological characteristic recognition module is located in the first through hole. The biological characteristic recognition module is abutted between the bracket and the chassis. The biological characteristic recognition module has at least one electronic component. The electronic component is accommodated in the accommodating slot.

In an embodiment of the disclosure, the back plate includes a first engagement portion. The bracket includes a second engagement portion. The first engagement portion is engaged to the second engagement portion.

In an embodiment of the disclosure, the back plate further includes a body portion. The first engagement portion is connected to a side of the body portion away from the chassis, such that a notch is formed between the first engagement portion and the body portion. The second engagement portion is abutted to the first engagement portion in the notch.

In an embodiment of the disclosure, the bracket further includes a board portion. The board portion has a fixing hole for a fixing element to pass through. The fixing hole and the second engagement portion are located at two sides of the accommodating slot respectively.

In an embodiment of the disclosure, the second engagement portion extends to a direction. The fixing hole is aligned to the second engagement in parallel with the direction.

In an embodiment of the disclosure, the chassis further includes a second through hole. The first through hole of the bracket and the second through hole of the chassis are aligned in a direction perpendicular to a surface of the chassis. At least a part of the biological characteristic recognition module is exposed by the second through hole.

In an embodiment of the disclosure, the electronic device further includes a gasket. The gasket is abutted between the biological characteristic recognition module and the chassis. The gasket surrounds the second through hole.

In an embodiment of the disclosure, the bracket further includes at least an abutted portion. The abutted portion is adjacent to the accommodating slot. The gasket and at least the part of the biological characteristic recognition module is clapped between the abutted portion and at least a part of the chassis.

In an embodiment of the disclosure, the abutted portion surrounds an edge of the accommodating slot.

In an embodiment of the disclosure, the biological characteristic recognition module has a peripheral area and a central area. The electronic component is located in the central area. The peripheral area surrounds the central area. The bracket further includes at least one abutted portion. The abutted portion is abutted to the biological characteristic recognition module. The abutted portion extends along the peripheral area.

Accordingly, in the electronic device of the disclosure, the biological characteristic recognition module is fixed to the chassis with a bracket having the accommodating slot. The electronic components of the biological characteristic recognition module are accommodated in the accommodating slot of the bracket to prevent the electronic components from colliding to the board portion of the bracket. Besides, the gasket is disposed between the chassis and the biological characteristic recognition module. The gasket prevents liquid from penetrating into the chassis or the happening of electrostatic discharge (ESD) to avoid the biological characteristic recognition module to be damaged.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
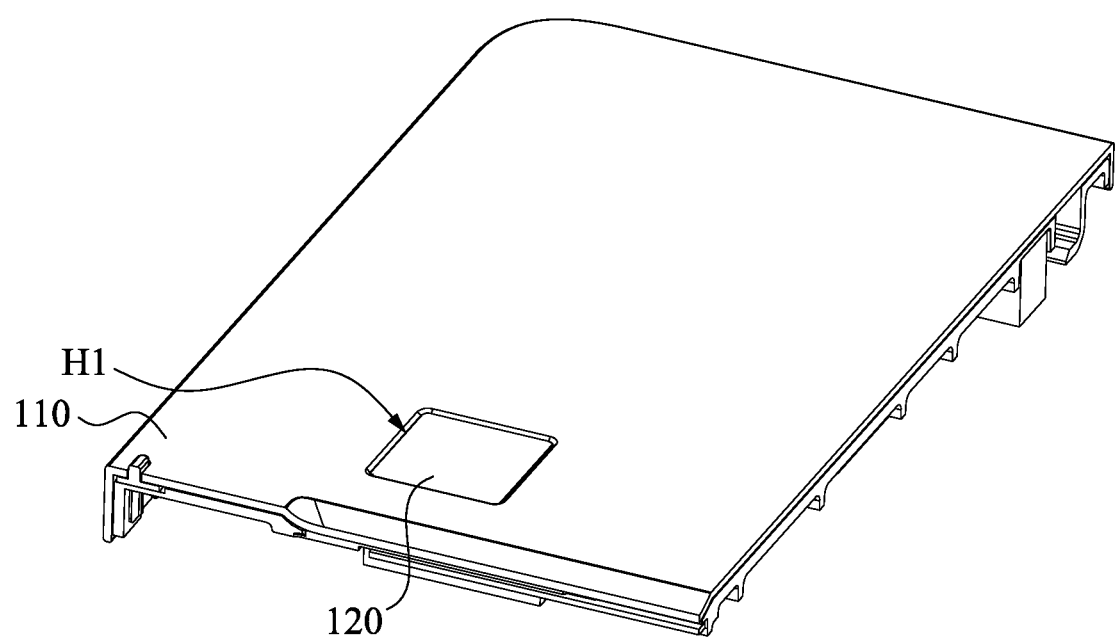
FIG. 1 is a partial perspective view of an electronic device according to an embodiment of the disclosure, wherein the drawing shows a front side of the electronic device.

Reference will be made in detail to the present embodiments of the disclosure, examples of which are illustrated in the accompanying drawings. However, the embodiments are not intended to limit the scope of the disclosure. The description of the operation of the structure is not intended to limit the order of the execution of the structure. Any element recombined structures with equal efficacy are within the scope of the disclosure. In addition, the drawings are for illustrative purpose only. The drawings are not drawn according to the original size. Wherever possible, the same reference numbers are used in the drawings and the description to refer to the same or like parts.

In addition, terms used in the specification and the claims generally have the usual meaning as each terms are used in the field, in the context of the disclosure and in the context of the particular content unless particularly specified. Some terms used to describe the disclosure are to be discussed below or elsewhere in the specification to provide additional guidance related to the description of the disclosure to specialists in the art.

Phrases "first," "second," etc., are solely used to separate the descriptions of elements or operations with same technical terms, not intended to be the meaning of order or to limit the invention.

Secondly, phrases "comprising," "includes," "provided," and the like, used in the context are all open-ended terms, i.e. including but not limited to.

Further, in the context, "a" and "the" can be generally referred to one or more unless the context particularly requires. It will be further understood that phrases "comprising," "includes," "provided," and the like, used in the context indicate the characterization, region, integer, step, operation, element and/or component it stated, but not exclude descriptions it stated or additional one or more other characterizations, regions, integers, steps, operations, elements, components and/or groups thereof.

Reference is made to FIG. 1. FIG. 1 is a partial perspective view of an electronic device 100 according to an embodiment of the disclosure, wherein the drawing shows a front side of the electronic device 100. As shown in FIG. 1, the electronic device 100 includes a chassis 110 and a biological characteristic recognition module 120. In the embodiment, the electronic device 100 can be a notebook, a cell phone, a personal computer, a tablet computer, a personal digital assistant (PDA), or other computer electronic device, but the disclosure is not be limited in this regard. The biological characteristic recognition module 120 can be used to acquire a biological characteristic recognition signal of an user to perform a biometric identification function. For example, the biological characteristics can be fingerprints, faces, irises, veins, signatures, or DNA. The disclosure is not limited in this regard. The chassis 110 has a through hole H1. At least a part of the biological characteristic recognition module 120 is exposed by the through hole H1 to read the biological characteristic recognition signals of the user.

Figure 2:
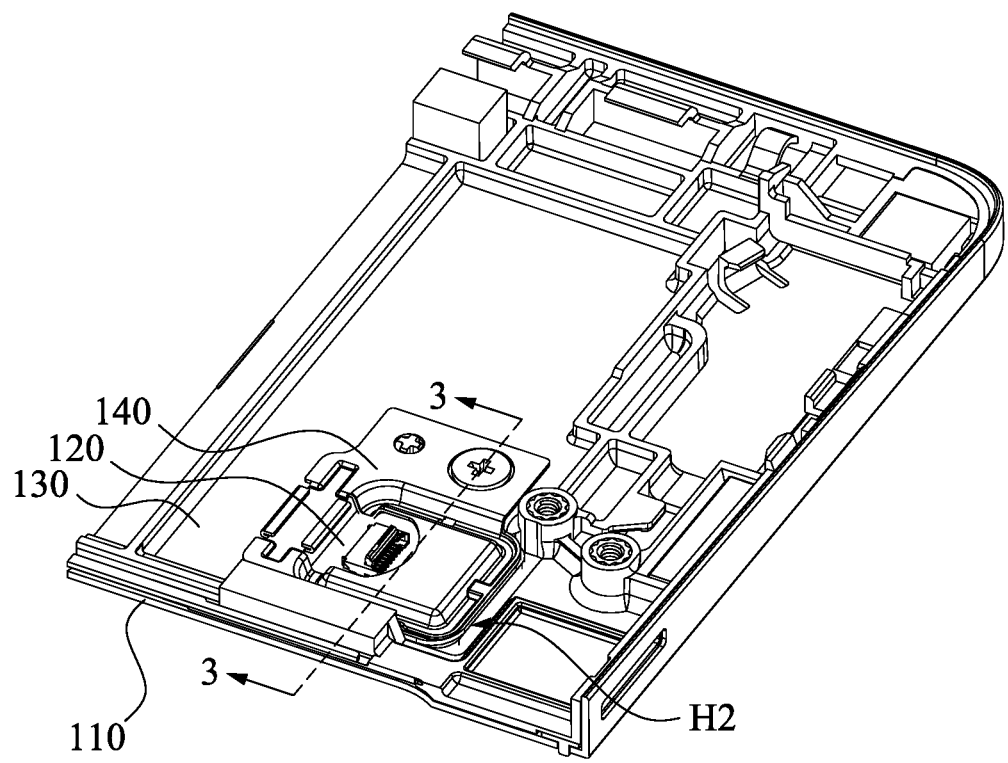
FIG. 2 is another partial perspective view of the electronic device in FIG. 1, wherein the drawing shows a back side of the electronic device.

Reference is made to FIG. 2. FIG. 2 is another partial perspective view of the electronic device 100 in FIG. 1, wherein the drawing shows a back side of the electronic device 100. As shown in FIG. 2, the electronic device 100 further includes a back plate 130 and a bracket 140. The back plate 130 is fixed to the chassis 110. In some embodiments, the back plate 130 is fixed to the chassis 110 by screwing, but the disclosure is not limited in this regard. The back plate has a through hole H2. The biological characteristic recognition module 120 is located in the through hole H2. The bracket 140 is fixed to a side of the back plate 130 away from the chassis 110, and at least partially covers the through hole H2. The biological characteristic recognition module 120 is disposed between the bracket 140 and the chassis 110.

Figure 3:
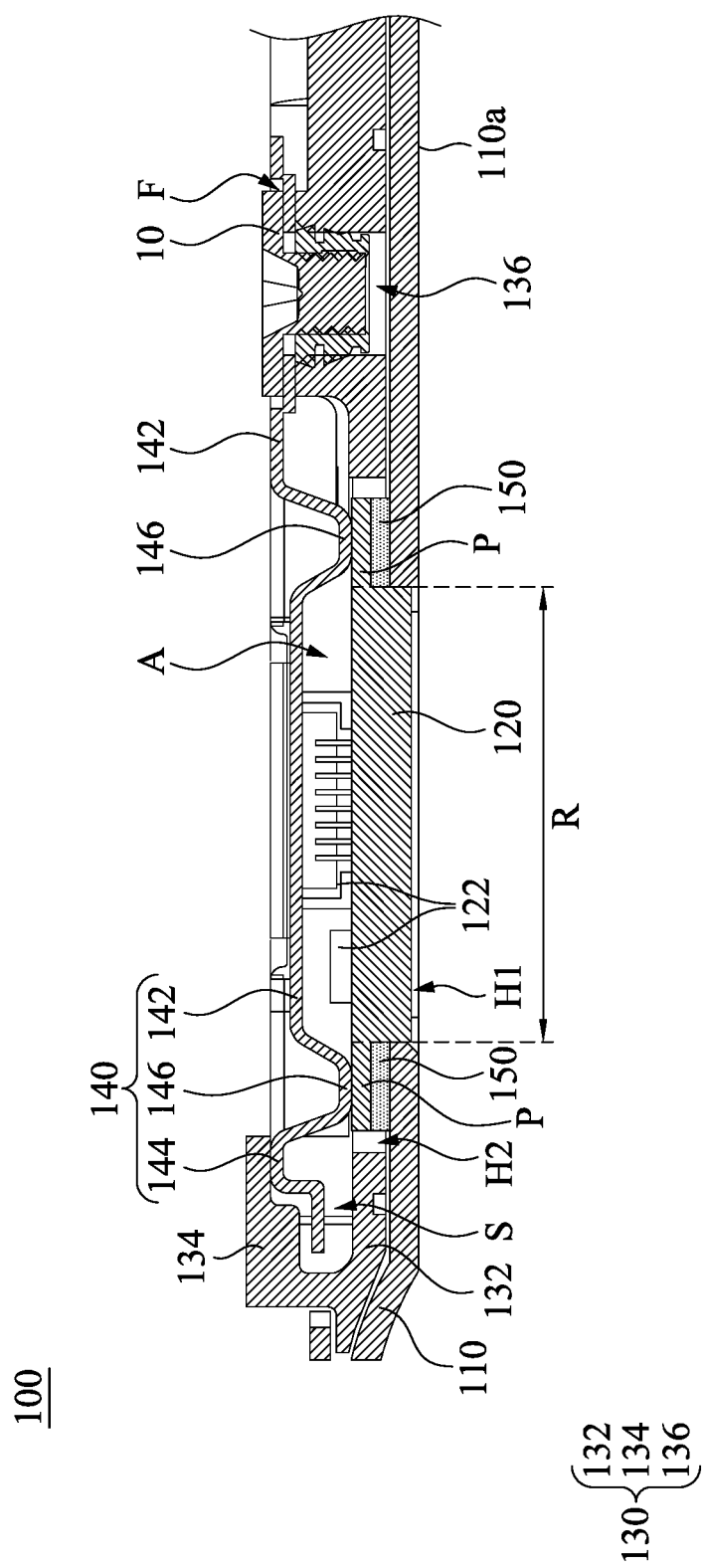
FIG. 3 is a cross-sectional view of the electronic device taken along line 3-3 in FIG. 2.

Reference is made to FIG. 3. FIG. 3 is a cross-sectional view of the electronic device 100 taken along line 3-3 in FIG. 2. As shown in FIG. 3, the through hole H1 of the chassis 110 is aligned to the through hole H2 of the back plate 130 in a direction perpendicular to a surface 110a of the chassis 110. As such, when the biological characteristic recognition module 120 is located in the through hole H2, the biological characteristic recognition module 120 is at least partially exposed by the through hole H1 to acquire the biological characteristic recognition signals of the user.

The electronic device 100 further includes a gasket 150. The gasket 150 is abutted between the biological characteristic recognition module 120 and the chassis 110 and surrounds the through hole H1. The bracket 140 includes a board portion 142 and an abutted portion 146. The abutted portion 146 is connected to the board portion 142 and protrudes toward the biological characteristic recognition module 120 relative to the board portion 142, such that an accommodating slot A is formed in the space enclosed by the abutted portion 146 and the board portion 142.

A side of the biological characteristic recognition modules 120 away from the chassis 110 has a peripheral area P and a central area R. The peripheral area P surrounds the central area R. The side of the biological characteristic recognition module 120 away from the chassis 110 further has electronic components 122. The electronic components 122 are centrally located in the central area R of the biological characteristic recognition module 120. The abutted portion 146 of the bracket 140 is abutted to the peripheral area P of the biological characteristic recognition module 120. The abutted portion 146 extends along the peripheral area P of the biological characteristic recognition module 120 to surrounds the central area R of the biological characteristic recognition module 120.

When the abutted portion 146 of the bracket 140 is abutted to the peripheral area P, the board portion 142 protrudes toward a direction away from the chassis 110 relative to the abutted portion 146. The accommodating slot A is located between the board portion 142 and the biological characteristic recognition module 120. As such, the electronic components 122 of the biological characteristic recognition module 120 can be accommodated in the accommodating slot A to prevent the electronic components 122 from being damaged by the pressing of the board portion 142.

Furthermore, the abutted portion 146 is abutted to the side of the biological characteristic recognition module 120 away from the gasket 150. The chassis 110 is abutted to a side of the gasket 150 away from the biological characteristic recognition module 120. Therefore, the gasket 150 and at least a part of the biological characteristic recognition module 120 is clapped between the abutted portion 146 and at least a part of the chassis 110. As such, the gasket 150 prevents dirt, e.g., liquid or dust, from entering the chassis 110 from the seam of the through hole H1 and the biological characteristic recognition module 120, resulting in malfunction or the short circuit of the biological characteristic recognition module 120 and other electronic elements in the chassis 110.

Moreover, in some embodiments, the gasket 150 is made of an elastomer containing a conductive material. Thereby, the gasket 150 is overlapped with the chassis 110 to guide the electrostatic between the human body and the biological characteristic recognition module 120 to be dispersed into the chassis 110. In this way, the electrostatic discharge is prevented from being concentrated on the biological characteristic recognition module 120, causing a current thermal effect and burning the biological characteristic recognition module 120.

In some embodiments, the abutted portion 146 is formed by pressing the board portion 142 to form a continuous annular convex hull or a curved convex hull. In other embodiments, the abutted portion 146 is a plurality of convex hulls. The plurality of convex hulls sequentially surround the central area R of the biological characteristic recognition module 120 to form a ring structure. The disclosure is not limited in this regard.

The back plate 130 includes a body portion 132 and a first engagement portion 134. The first engagement portion 134 is connected to a side of the body portion 132 away from the chassis 110, such that a notch S is formed between the first engagement portion 134 and the body portion 132. The bracket 140 further includes a second engagement portion 144. The second engagement portion 144 is coupled to an end of the board portion 142 through the abutted portion 146. The second engagement portion 144 extends toward the notch S. The second engagement portion 144 is abutted to the first engagement portion 134 of the back plate 130 in the notch S.

The board portion 142 of the bracket 140 has a fixing hole F. The back plate 130 further has a locking hole 136. The locking hole 136 is disposed in the body portion 132. When the first engagement portion 134 of the back plate 130 is engaged to the second engagement portion 144 of the bracket 140, the fixing hole F of the board portion 142 is aligned to the locking hole 136 of the back plate 130 in the direction perpendicular to the surface 110a of the chassis 110. In this way, a fixing element 10 is able to pass through the fixing hole F and be locked to the locking hole 136 so as to fix the back plate 130 and the bracket 140.

The second engagement portion 144 and the fixing hole F are located at two sides of the accommodating slot A respectively. When the bracket 140 is assembled to the back plate 130, the second engagement portion 144 is first inserted into the notch S to make the first engagement portion 134 be engaged to the second engagement portion 144. Then, the fixing element 10 is inserted into the fixing hole F and the locking hole 136 to fix the bracket 140 and the back plate 130. By the engagement of the first engagement portion 134 and the second engagement portion 144 and the fixing of the fixing element 10, a number of components of the electronic device 100 can be saved, and the assembly cost can be reduced.

In some embodiments, the fixing element 10 is a screw. The back plate 130 further includes a fixing post. The locking hole 136 is formed in the fixing post. In other embodiments, the locking hole 136 is integrally formed on the body portion 132 of the back plate 130. The disclosure should not be limited in this regard.

Figure 4:
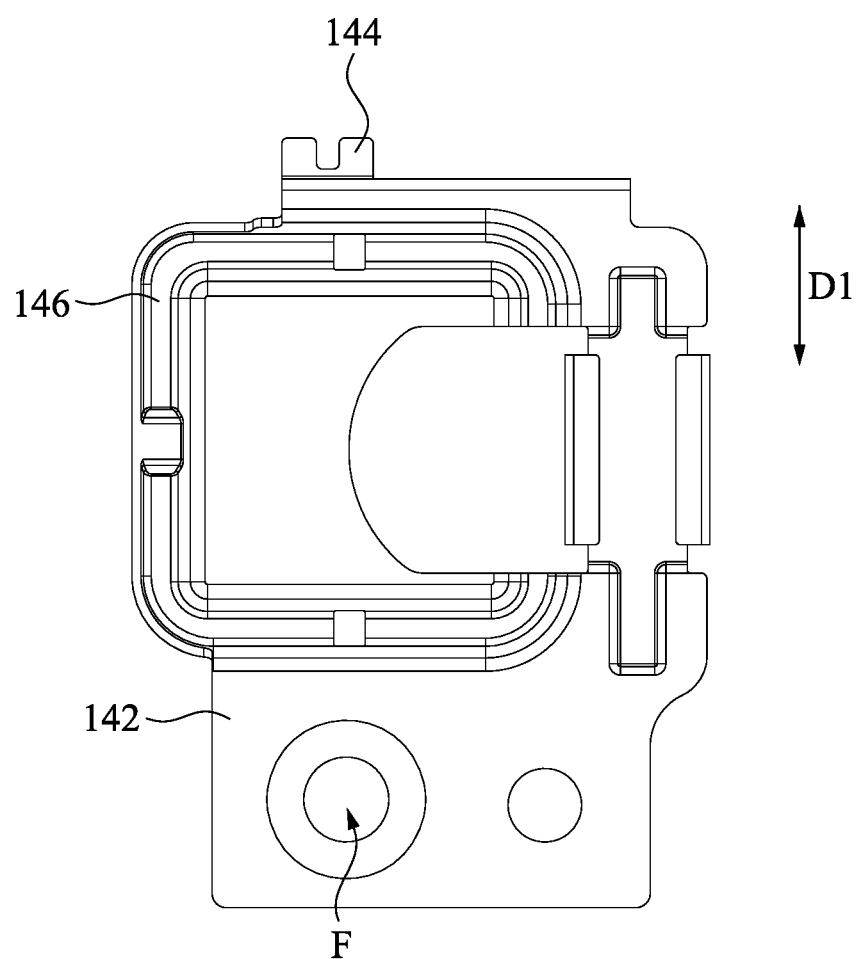
FIG. 4 is a front view of the bracket in FIG. 2.

Reference is made to FIG. 4. FIG. 4 is a front view of the bracket 140 in FIG. 2. As shown in FIG. 2, the second engagement portion 144 is adjacent to the abutted portion 146. The second engagement portion 144 extends toward a direction D1 away from the board portion 142. The fixing hole F is aligned to the second engagement portion 144 in a direction parallel to the extending direction D1 of the second engagement portion 144. As such, when the second engagement portion 144 is engaged to the first engagement portion 134, and then the fixing element 10 is used to fix the back plate 130 and the bracket 140, a side of the board portion 142 opposite to the second engagement portion 144 can be avoided to be lifted relative to the back plate 130.

According to the foregoing recitations of the embodiments of the disclosure, it can be seen that in the electronic device of the disclosure, the biological characteristic recognition module is fixed to the chassis with a bracket having the accommodating slot. The electronic component of the biological characteristic recognition module is accommodated in the accommodating slot of the bracket to prevent the electronic component from colliding to the body portion of the bracket. Besides, the gasket is disposed between the chassis and the biological characteristic recognition module. The gasket prevents liquid from penetrating into the chassis or the happening of electrostatic discharge (ESD) to avoid the biological characteristic recognition module to be damaged.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:
1. An electronic device, comprising:
a chassis;
a back plate fixed to the chassis and having a first through hole;
a bracket fixed to a side of the back plate away from the chassis and having an accommodating slot recessed away from the chassis; and
a biological characteristic recognition module located in the first through hole and abutted between the bracket and the chassis, wherein the biological characteristic recognition module has at least one electronic component accommodated in the accommodating slot;
wherein the back plate comprises a first engagement portion and a body portion, the bracket comprises a second engagement portion, the first engagement portion is engaged to the second engagement portion, and the first engagement portion is connected to a side of the body portion away from the chassis, such that a notch is formed between the first engagement portion and the body portion, and the second engagement portion is abutted to the first engagement portion in the notch.

2. The electronic device of claim 1, wherein the bracket further comprises a board portion, the board portion has a fixing hole for a fixing element to pass through, and the fixing hole and the second engagement portion are located at two sides of the accommodating slot respectively.

3. The electronic device of claim 2, wherein the second engagement portion extends to a direction, and the fixing hole is aligned to the second engagement portion in parallel with the direction.

4. The electronic device of claim 1, wherein the chassis further comprises a second through hole, the first through hole of the bracket and the second through hole of the chassis are aligned in a direction perpendicular to a surface of the chassis, and at least a part of the biological characteristic recognition module is exposed by the second through hole.

5. The electronic device of claim 4, further comprises a gasket abutted between the biological characteristic recognition module and the chassis and surrounding the second through hole.

6. The electronic device of claim 1, wherein the biological characteristic recognition module has a peripheral area and a central area, the electronic component is located in the central area, the peripheral area surrounds the central area, and the bracket further comprises at least one abutted portion abutted to the biological characteristic recognition module and the abutted portion extends along the peripheral area.

* * * * *